(12) United States Patent
Wu

(10) Patent No.: US 11,729,120 B2
(45) Date of Patent: Aug. 15, 2023

(54) GENERATING RESPONSES IN AUTOMATED CHATTING

(71) Applicant: Microsoft Technology Licensing, LLC, Redmond, WA (US)

(72) Inventor: Xianchao Wu, Tokyo (JP)

(73) Assignee: Microsoft Technology Licensing, LLC, Redmond, WA (US)

( * ) Notice: Subject to any disclaimer, the term of this patent is extended or adjusted under 35 U.S.C. 154(b) by 194 days.

(21) Appl. No.: 16/485,898

(22) PCT Filed: Mar. 16, 2017

(86) PCT No.: PCT/CN2017/076872
§ 371 (c)(1),
(2) Date: Aug. 14, 2019

(87) PCT Pub. No.: WO2018/165932
PCT Pub. Date: Sep. 20, 2018

(65) Prior Publication Data
US 2020/0044993 A1 Feb. 6, 2020

(51) Int. Cl.
*G06F 17/00* (2019.01)
*H04L 51/02* (2022.01)
*G06F 40/56* (2020.01)
*G06F 40/274* (2020.01)
*G06N 5/02* (2023.01)

(52) U.S. Cl.
CPC ............ *H04L 51/02* (2013.01); *G06F 40/274* (2020.01); *G06F 40/56* (2020.01); *G06N 5/02* (2013.01)

(58) Field of Classification Search
CPC ....... H04L 51/02; G06F 40/56; G06F 40/274; G06N 5/02

USPC .......................................................... 709/206
See application file for complete search history.

(56) References Cited

U.S. PATENT DOCUMENTS

| 5,237,502 A * | 8/1993 | White | G06F 40/205 704/9 |
| 6,665,666 B1 * | 12/2003 | Brown | G06F 16/3338 707/999.005 |
| 6,829,603 B1 * | 12/2004 | Chai | G06F 16/3344 707/999.005 |

(Continued)

FOREIGN PATENT DOCUMENTS

| CN | 202736475 U | 2/2013 |
| CN | 103124980 A | 5/2013 |

(Continued)

OTHER PUBLICATIONS

Bickel, S. et al.,"Learning to Complete Sentences," (2005), Springer-Verlog, pp. 497-504.*

(Continued)

*Primary Examiner* — Cesar B Paula
*Assistant Examiner* — James H. Blackwell
(74) *Attorney, Agent, or Firm* — Schwegman Lundberg & Woessner, P.A.

(57) ABSTRACT

The present disclosure provides method and apparatus for generating responses in automated chatting. A message in a chat flow may be obtained. A plurality of candidate responses to the message may be determined. The candidate responses may be ranked based at least on knowledge data. A response to the message may be generated based at least on one or more ranked candidate responses.

18 Claims, 7 Drawing Sheets

(56) References Cited

U.S. PATENT DOCUMENTS

| | | | |
|---|---|---|---|
| 6,983,252 B2* | 1/2006 | Matheson | G06F 9/451 704/270.1 |
| 7,136,909 B2* | 11/2006 | Balasuriya | G06F 3/038 710/14 |
| 7,139,752 B2* | 11/2006 | Broder | G06F 16/3344 707/999.005 |
| 7,216,073 B2* | 5/2007 | Lavi | G06F 40/284 704/9 |
| 7,236,968 B2* | 6/2007 | Seki | G06F 16/3329 |
| 7,293,015 B2* | 11/2007 | Zhou | G06F 40/253 707/999.005 |
| 7,299,228 B2* | 11/2007 | Cao | G06F 16/30 |
| 7,313,515 B2* | 12/2007 | Crouch | G06N 5/02 704/9 |
| 7,870,550 B1 | 1/2011 | Qureshi et al. | |
| 8,275,803 B2* | 9/2012 | Brown | G06F 16/334 705/14.44 |
| 8,346,701 B2* | 1/2013 | Wang | G06F 16/33 706/46 |
| 8,768,925 B2 | 7/2014 | Brown et al. | |
| 9,189,749 B2 | 11/2015 | Estes | |
| 2004/0249808 A1* | 12/2004 | Azzam | G06F 16/3325 |
| 2007/0196804 A1* | 8/2007 | Yoshimura | G09B 7/02 434/323 |
| 2007/0203863 A1* | 8/2007 | Gupta | G06N 3/0454 706/20 |
| 2008/0046394 A1 | 2/2008 | Zhou et al. | |
| 2009/0287678 A1* | 11/2009 | Brown | G06F 16/334 |
| 2011/0125734 A1 | 5/2011 | Duboue et al. | |
| 2014/0122618 A1 | 5/2014 | Duan | |
| 2014/0272884 A1 | 9/2014 | Allen et al. | |
| 2014/0280623 A1 | 9/2014 | Duan | |
| 2014/0358890 A1 | 12/2014 | Chen et al. | |
| 2015/0178623 A1* | 6/2015 | Balani | G06N 5/025 706/48 |
| 2015/0293899 A1 | 10/2015 | Baughman et al. | |
| 2015/0363696 A1* | 12/2015 | Konya | G06F 16/90332 706/11 |
| 2015/0379087 A1 | 12/2015 | Lee et al. | |
| 2016/0044380 A1 | 2/2016 | Barrett | |
| 2016/0306800 A1* | 10/2016 | Son | H04L 51/02 |
| 2016/0350653 A1* | 12/2016 | Socher | G06N 5/04 |
| 2016/0352656 A1* | 12/2016 | Galley | G06N 3/0454 |
| 2016/0352657 A1 | 12/2016 | Galley et al. | |
| 2017/0060844 A1* | 3/2017 | He | G06F 16/3331 |
| 2017/0103324 A1* | 4/2017 | Weston | G06N 5/04 |
| 2017/0249311 A1* | 8/2017 | Pelleg | G06N 5/04 |
| 2017/0351750 A1* | 12/2017 | Rokhlenko | G06F 16/9535 |
| 2018/0011838 A1* | 1/2018 | Beller | G06F 40/186 |
| 2018/0150743 A1* | 5/2018 | Ma | G06N 3/0445 |
| 2018/0157747 A1* | 6/2018 | Tiwary | G06N 3/08 |
| 2018/0189628 A1* | 7/2018 | Kaufmann | H04L 51/36 |

FOREIGN PATENT DOCUMENTS

| | | |
|---|---|---|
| CN | 103229120 A | 7/2013 |
| CN | 105589844 A | 5/2016 |
| CN | 105630917 A | 6/2016 |
| CN | 106293348 A | 1/2017 |

OTHER PUBLICATIONS

Grabski, K. et al.,"Sentence Completion," (2004), ACM, pp. 433-439.*
Weston, J. et al.,"Memory Networks," (Nov. 29, 2015), arXiv, pp. 1-15.*
Kumar, A. et al.,"Aske Me Anything: Dynamic Memory Networks for Natural Language Processing," (2016), 10 pages.*
Sukhbaatar, S. et al.,"End-to-End Memory Networks," (Nov. 24, 2015), arXiv, pp. 1-11.*
Swafford, Z. et al.,"LSTMs and Dynamic Memory Networks for Human-Written Simple Question Answering," (2016), pp. 1-8.*
Ramachandran, G.S. et al.,"Ask Me Even More: Dynamic Memory Tensor Networks (Extended Model)," (Mar. 11, 2017), 8 pages.*
Raghuvanshi, A. et al.,"Dynamic Memory Networks for Question Answering," 2016, pp. 1-9.*
Chandar, S. et al.,"Hierarchical Memory Networks," May 24, 2016, arXiv, 10 pages.*
Northcutt, C.G. et al.,"Comment Ranking Diversification in Forum Discussions," Apr. 2017, ACM pp. 327-330.*
Cheng, J. et al.,"Long Short-Term Memory-Networks for Machine Reading," Sep. 20, 2016, arXiv, 11 pages.*
Adiwardana et al.,"Question Answering with Dynamic Memory Networks from Knowledge Encoded in Natural Language," (archived May 19, 2017), 9 pages. (Year: 2017).*
Alonso et al.,"On the Use of Parsing for Named Entity Recognition," (May 25, 2021), Appl. Sci. 2021, 11, 1090, 24 pages. (Year: 2021).*
Jurafsky, D. et al.,"Speech and Language Processing: Chapter 14: Dependency Parsing," (2021), pp. 1-27. (Year: 2021).*
Li, G. et al.,"Incorporating External Knowledge to Answer Open-Domain Visual Questions with Dynamic Memory Networks," Dec. 3, 2017, arXiv, pp. 1-11. (Year: 2017).*
Lin, D. et al.,"Dynamic Memory Network on Natural Lanuage Question-Answering," (2015), Stanford University, pp. 1-9. (Year: 2015).*
Qu, S.,"Visual Question Answering Using Various Methods," pp. 1-6. (Year: 2017).*
Stroh, E. et al.,"Question ANswering Using Deep Learning," (May 17, 2017), 12 pages. (Year: 2017).*
Kannan, A. et al.,"Smart Reply: Automated Response Suggestion for Email," (2016), ACM, pp. 955-964.*
Zhang, M. et al.,"Avoiding Monotony: Improving the Diversity of Recommendation Lists," 2008, ACM, pp. 123-130.*
Unger, C. et al.,"An Introduction to Question Answering over Linked Data," 2014, Springer, pp. 100-140.*
Lamjiri, A.K. et al.,"Comparing the Contribution of Syntactic and Semantic Features in Closed Versus Open Domain Question Answering," 2007, IEEE, pp. 679-685.*
Achananuparp, P. et al.,"Answer Diversification for Complex Question Answering on the Web," Springer, 2010, pp. 375-382.*
K. Bradley and B. Smyth. Improving recommendation diversity. In Proc, 12th Irish Conf. Artificial Intelligence and Cognitive Science, 2001.*
Smyth, B. et al.,"Similarity vs. Diversity," 2001, Springer-Verlag, pp. 347-361.*
"Second Office Action Issued in Chinese Patent Application No. 201780035986.8", dated Sep. 6, 2021, 12 Pages.
"Sentence Fragments", Retrieved From: https://web.archive.org/web/20120723154856/https://www.esc.edu/online-writing-center/resources/grammar/sentence-fragments/, Retrieved On: Jul. 23, 2012, 2 Pages.
Britz, Denny, "Deep Learning for Chatbots, Part 1—Introduction", Retrieved From: http://www.wildml.com/2016/04/deep-learning-for-chatbots-part-1-introduction/, Apr. 6, 2016, 14 Pages.
Geitgey, Adam, "Machine Learning is Fun Part 5: Language Translation with Deep Learning and the Magic of Sequences", Retrieved From: https://medium.com/@ageitgey/machine-learning-is-fun-part-5-language-translation-with-deep-learning-and-the-magic-of-sequences-2ace0acca0aa#.by1am7136, Aug. 21, 2016, 19 Pages.
Li, et al.,"Deep Reinforcement Learning for Dialogue Generation", In Proceedings of the 2016 Conference on Empirical Methods in Natural Language Processing, Nov. 1, 2016, pp. 1192-1202.
NANODANO,"AI Chat Bot in Python with AIML", Retrieved from: https://www.devdungeon.com/content/ai-chat-bot-python-aiml, Aug. 3, 2015, 22 Pages.
"International Search Report and Written Opinion Issued in PCT Application No. PCT/CN2017/076872", dated Nov. 30, 2017, 12 Pages.
Thomason,"Learning to Interpret Natural Language Commands through Human-Robot Dialog", In Proceedings of the 24th International Joint Conference on Artificial Intelligence, Jul. 25, 2015, pp. 1923-1929.

(56) References Cited

OTHER PUBLICATIONS

Wallace, Richard,"All About Pandorabots", Retrieved From: https://pandorabots.com/static/html/sharedglossary.html, Jan. 2, 2014, 7 Pages.

Wang, et al.,"Improving Sentence Completion in Dialogues with Multi-Modal Features", In Proceedings of the 13th Annual Meeting of the Special Interest Group on Discourse and Dialogue, Jul. 5, 2012, pp. 290-294.

Wang, et al.,"Recognizing Textual Relatedness with Predicate-Argument Structures", In Proceedings of the 2009 Conference on Empirical Methods in Natural Language Processing, Aug. 6, 2009, pp. 784-792.

"Extended European Search Report Issued in European Patent Application No. 17900662.2", dated Oct. 2, 2020, 10 Pages.

Xiong, et al., "Dynamic Memory Networks for visual and textual question answering", In Journal of Computing Research Repository, Mar. 4, 2016, 10 Pages.

"Office Action Issued in Chinese Patent Application No. 201780035986.8", (w/ English Translation), dated Mar. 22, 2021, 23 Pages.

"Office Action and Search Report Issued in Chinese Patent Application No. 201780035986.8", dated Oct. 21, 2022, 15 Pages.

"Office Action Issued in India Patent Application No. 201917035348", dated Jan. 10, 2022, 6 Pages.

"Office Action Issued in Chinese Patent Application No. 201780035986.8", dated Mar. 25, 2022, 12 Pages.

"Office Action Issued in Indian Patent Application No. 201917035348", dated Mar. 16, 2023, 7 Pages.

"Notice of Allowance Issued in Chinese Patent Application No. 201780035986.8", dated Mar. 17, 2023, 4 Pages.

\* cited by examiner

GENERATING RESPONSES IN AUTOMATED CHATTING

CROSS-REFERENCE TO RELATED APPLICATIONS

This application is a U.S. National Stage Filing under 35 U.S.C. 371 of International Patent Application Serial No. PCT/CN2017/076872, filed Mar. 16, 2017, and published as WO 2018/165932 A1 on Sep. 20, 2018, which application and publication are incorporated herein by reference in their entirety.

BACKGROUND

Artificial Intelligence (AI) chatbot is becoming more and more popular, and is being applied in an increasing number of scenarios. The chatbot is designed to simulate people's conversation, and may chat with users by text, speech, image, etc. Generally, the chatbot may scan for keywords within a message inputted by a user or apply natural language processing on the message, and provide a response with the most matching keywords or the most similar wording pattern to the user.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose a response providing model based on a combination of a ranking procedure and a generating procedure. The embodiments of the present disclosure may generate training data for the response providing model through a semantic structure completion process. The embodiments of the present disclosure may use the semantic structure completion process for completing syntactic gaps in a message.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

Figure 1:
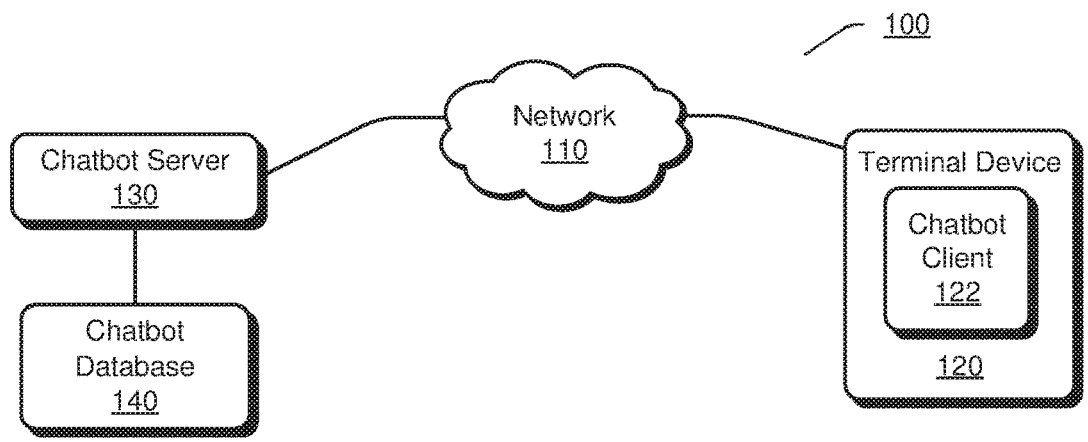
FIG. 1 illustrates an exemplary application scenario of a chatbot according to an embodiment.

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

AI chatbot may use a response providing model for providing automated responses to messages, e.g., queries, comments, replies, etc., inputted by users. The response providing model may include a mechanism for determining or generating responses based on messages.

In a conventional response providing model, a ranking procedure may be used for determining responses. For example, a large-scale message-response set may be established, which comprises predetermined messages and corresponding candidate responses. Upon receiving a message, those candidate responses in the message-response set that are associated with the message may be ranked, and a response to the message may be determined from the ranked candidate responses. In this ranking-based response providing model, responses are determined directly from the candidate responses included in the message-response set. Although these candidate responses may be suitable for responding to messages being semantically relevant to the predetermined messages in the message-response set, these candidate responses may be not suitable for new messages, e.g., messages having no semantically relevant predetermined messages in the message-response set. Moreover, the responses determined through this model may lack semantic diversity.

In another conventional response providing model, a generating procedure may be used for generating responses. The generating procedure has a capability of learning, and may adopt Statistical Machine Translation (SMT) or Neural Machine Translation (NMT) to generate responses. In this generating-based response providing model, responses may be generated through machine translation and word combination. The generated responses may be frequently quite short, have similar expression patterns with messages, and seem like fake sentences instead of natural language sentences. Moreover, the responses determined through this model focus on semantic similarity, but may lack semantic diversity.

In some aspects, embodiments of the present disclosure propose a response providing model based on a combination of a ranking procedure and a generating procedure. Knowledge data is introduced into the generating and ranking of candidate responses. Herein, knowledge data may refer to knowledge information obtained from knowledge-style websites on the network, e.g., Wikipedia, which can contribute to improve semantic diversity. A ranking result of candidate responses may be provided to a generating procedure as an additional input. A response generated through the generating procedure may be based at least on the ranking result and thus may include knowledge information. The response providing model according to the embodiments of the present disclosure may ensure that responses have both semantic similarity and semantic diversity, and are in an expression form of natural language sentences.

In other aspects, the embodiments of the present disclosure may generate training data for the response providing model through a semantic structure completion process. Usually, during chatting, a user or a chatbot may use brief sentences instead of completed sentences, e.g., one or more parts including subject, object, etc. of a sentence may be omitted. The semantic structure completion process may perform semantic structure completion on messages and responses in a chat flow, and the completed messages and responses may be used as training data for the response providing model. Herein, the chat flow may refer to a chatting procedure including messages from the user and responses from the chatbot, and the semantic structure completion may refer to completing syntactic gaps in sentences. In some implementations, the syntactic gaps in sentences may be completed based on a predicate-argument structure analysis. The training data obtained through the semantic structure completion process may facilitate to perform training of semantic similarity and semantic diversity in the response providing model.

In further aspects, the embodiments of the present disclosure may use the semantic structure completion process for completing syntactic gaps in a current message, and the completed current message may be further used by the response providing model for generating a corresponding response.

FIG. 1 illustrates an exemplary application scenario 100 of a chatbot according to an embodiment.

In FIG. 1, a network 110 is applied for interconnecting among a terminal device 120 and a chatbot server 130.

The network 110 may be any type of networks capable of interconnecting network entities. The network 110 may be a single network or a combination of various networks. In terms of coverage range, the network 110 may be a Local Area Network (LAN), a Wide Area Network (WAN), etc. In terms of carrying medium, the network 110 may be a wireline network, a wireless network, etc. In terms of data switching techniques, the network 110 may be a circuit switching network, a packet switching network, etc.

The terminal device 120 may be any type of electronic computing devices capable of connecting to the network 110, assessing servers or websites on the network 110, processing data or signals, etc. For example, the terminal device 120 may be a desktop computer, a laptop, a tablet, a smart phone, etc. Although only one terminal device 120 is shown in FIG. 1, it should be appreciated that a different number of terminal devices may connect to the network 110.

The terminal device 120 may include a chatbot client 122 which may provide automated chatting service for a user. In some implementations, the chatbot client 122 may interact with the chatbot server 130. For example, the chatbot client 122 may transmit messages inputted by the user to the chatbot server 130, and receive responses associated with the messages from the chatbot server 130. However, it should be appreciated that, in other implementations, instead of interacting with the chatbot server 130, the chatbot client 122 may also locally generate responses to messages inputted by the user.

The chatbot server 130 may connect to or incorporate a chatbot database 140. The chatbot database 140 may comprise information that can be used by the chatbot server 130 for generating responses.

It should be appreciated that all the network entities shown in FIG. 1 are exemplary, and depending on specific application requirements, any other network entities may be involved in the application scenario 100.

Figure 2:
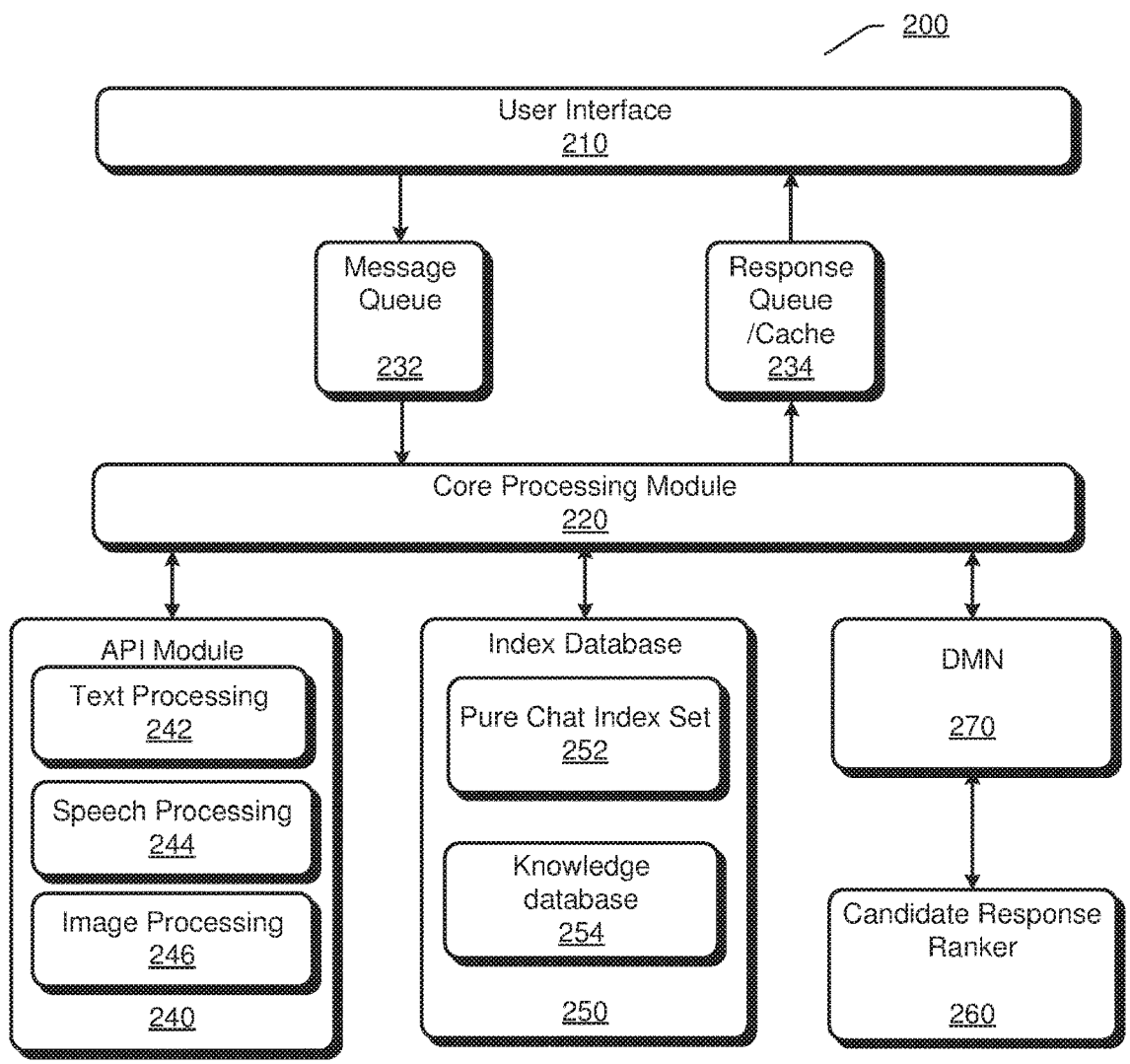
FIG. 2 illustrates an exemplary chatbot system according to an embodiment.

FIG. 2 illustrates an exemplary chatbot system 200 according to an embodiment.

The chatbot system 200 may comprise a user interface (UI) 210 for presenting a chat window. The chat window may be used by the chatbot for interacting with a user.

The chatbot system 200 may comprise a core processing module 220. The core processing module 220 is configured for, during operation of the chatbot, providing processing capabilities through cooperation with other modules of the chatbot system 200.

The core processing module 220 may obtain messages inputted by the user in the chat window, and store the messages in the message queue 232. The messages may be in various multimedia forms, such as, text, speech, image, video, etc.

The core processing module 220 may process the messages in the message queue 232 in a first-in-first-out manner. The core processing module 220 may invoke processing units in an application program interface (API) module 240 for processing various forms of messages. The API module 240 may comprise a text processing unit 242, a speech processing unit 244, an image processing unit 246, etc.

For a text message, the text processing unit 242 may perform text understanding on the text message, and the core processing module 220 may further determine a text response.

For a speech message, the speech processing unit 244 may perform a speech-to-text conversion on the speech message to obtain text sentences, the text processing unit 242 may perform text understanding on the obtained text sentences, and the core processing module 220 may further determine a text response. If it is determined to provide a response in speech, the speech processing unit 244 may perform a text-to-speech conversion on the text response to generate a corresponding speech response.

For an image message, the image processing unit 246 may perform image recognition on the image message to generate corresponding texts, and the core processing module 220 may further determine a text response. In some cases, the image processing unit 246 may also be used for obtaining an image response based on the text response.

Moreover, although not shown in FIG. 2, the API module 240 may also comprise any other processing units. For example, the API module 240 may comprise a video processing unit for cooperating with the core processing module 220 to process a video message and determine a response.

The core processing module 220 may determine responses through an index database 250. The index database 250 may comprise a plurality of index items that can be retrieved by the core processing module 220 as responses. The index items in the index database 250 may be classified into a pure chat index set 252 and a knowledge database 254. The pure chat index set 252 may comprise index items that are prepared for free chatting between users and the chatbot, and may be established with data from social networks. The index items in the pure chat index set 252 may or may not be in a form of question-answer pair. The question-answer pair may also be referred to as message-response pair. The knowledge database 254 may comprise knowledge data generated based on knowledge information from knowledge-style websites on the network. The knowledge data in the knowledge database may also be referred to as knowledge graph.

The core processing module 220 may utilize a candidate response ranker 260 and a Dynamic Memory Network (DMN) model 270 for generating responses. The candidate response ranker 260 may rank a plurality of candidate responses to a message. The DMN model 270 may generate a response to the message based at least on the ranked candidate responses.

The responses determined by the core processing module 220 may be provided to a response queue or response cache 234. For example, the response cache 234 may ensure that a sequence of responses can be displayed in a pre-defined time stream. Assuming that, for a message, there are no less than two responses determined by the core processing module 220, then a time-delay setting for the responses may be necessary. For example, if a message inputted by the player is "Did you eat your breakfast?", two responses may be determined, such as, a first response "Yes, I ate bread" and a second response "How about you? Still feeling hungry?". In this case, through the response cache 234, the chatbot may ensure that the first response is provided to the player immediately. Further, the chatbot may ensure that the second response is provided in a time delay, such as 1 or 2 seconds, so that the second response will be provided to the player 1 or 2 seconds after the first response. As such, the response cache 234 may manage the to-be-sent responses and appropriate timing for each response.

The responses in the response queue or response cache 234 may be further transferred to the user interface 210 such that the responses can be displayed to the user in the chat window.

It should be appreciated that all the elements shown in the chatbot system 200 in FIG. 2 are exemplary, and depending on specific application requirements, any shown elements may be omitted and any other elements may be involved in the chatbot system 200.

Figure 3:
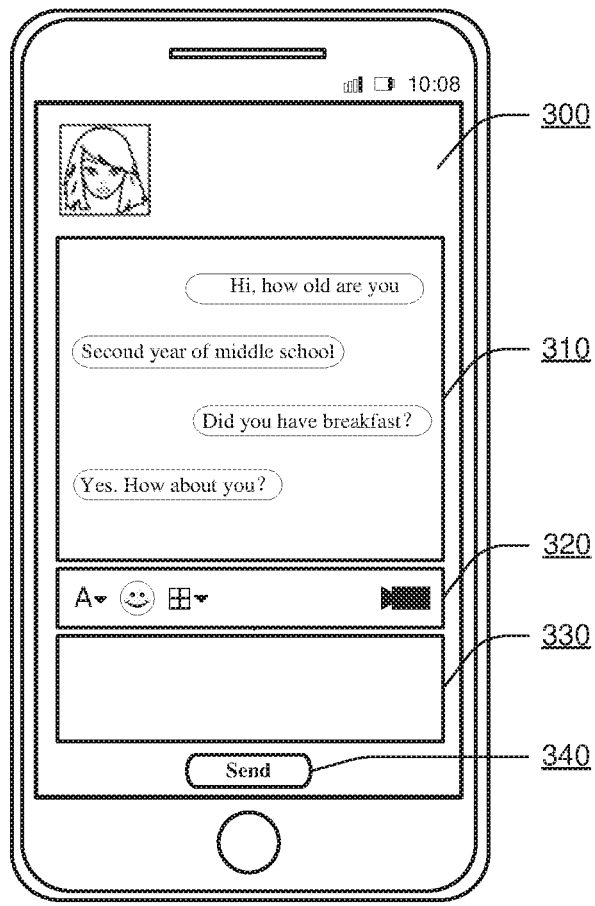
FIG. 3 illustrates an exemplary chat window according to an embodiment.

FIG. 3 illustrates an exemplary chat window 300 according to an embodiment. The chat window 300 may comprise a presentation area 310, a control area 320 and an input area 330. The presentation area 310 displays messages and responses in a chat flow. The control area 320 includes a plurality of virtual buttons for the user to perform message input settings. For example, the user may select to make a voice input, attach image files, select emoji symbols, make a short-cut of the current screen, etc. through the control area 320. The input area 330 is used for the user to input messages. For example, the user may type text through the input area 330. The chat window 300 may further comprise a virtual button 340 for confirming to send inputted messages. If the user touches the virtual button 340, the messages inputted in the input area 330 may be sent to the presentation area 310.

It should be noted that all the elements and their layout shown in FIG. 3 are exemplary. Depending on specific application requirements, the chat window in FIG. 3 may omit or add any elements, and the layout of the elements in the chat window in FIG. 3 may also be changed in various manners.

Figure 4:
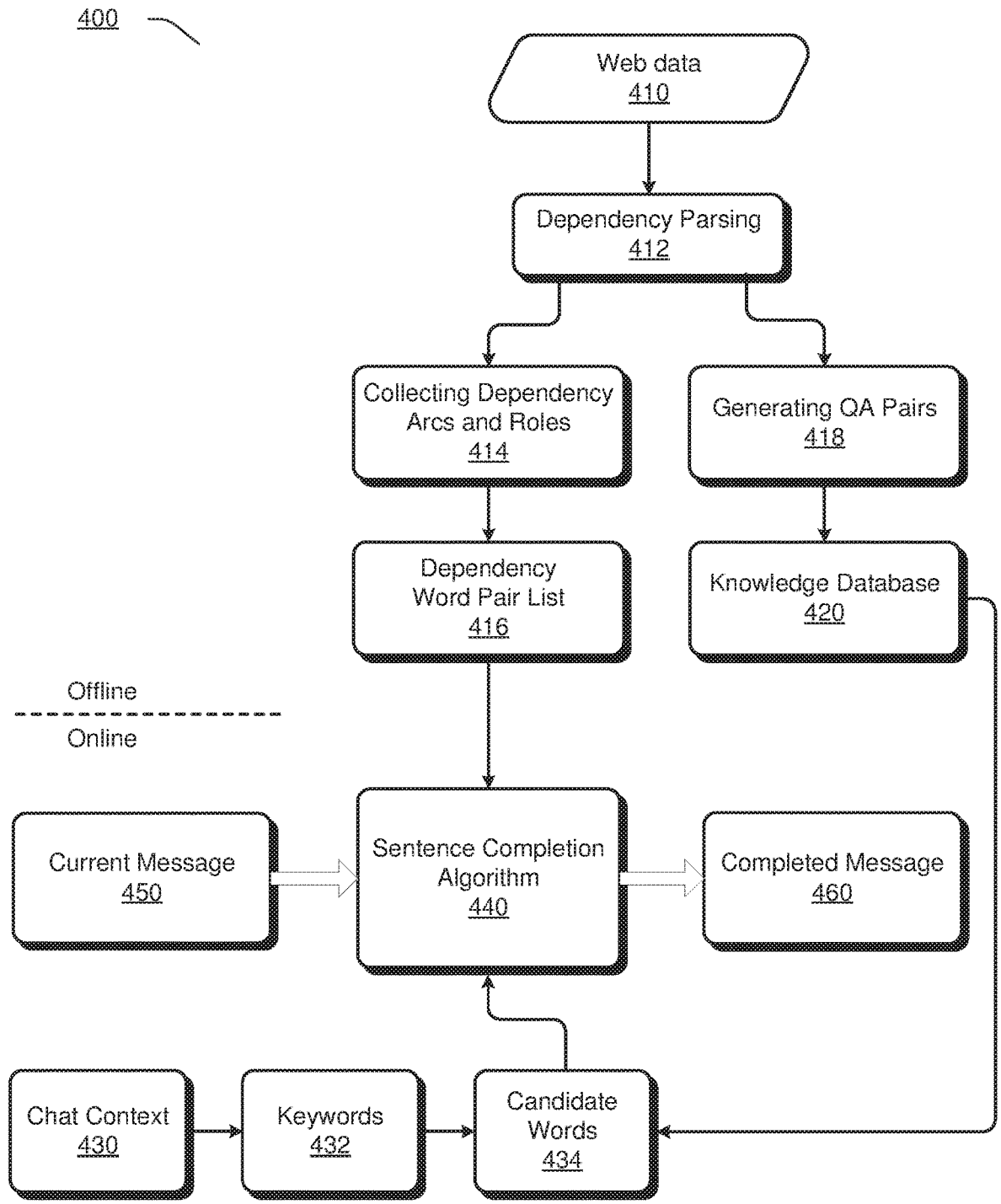
FIG. 4 illustrates an exemplary process for semantic structure completion according to an embodiment.

FIG. 4 illustrates an exemplary process 400 for semantic structure completion according to an embodiment. The process 400 may be used for completing syntactic gaps in sentences in a chat flow. The upper part of FIG. 4 is an offline data mining procedure, and the lower part of FIG. 4 is an online applying procedure.

At 410, web data may be crawled from the network. For example, the web data may be knowledge information from knowledge-style websites on the network, e.g., Wikipedia, Zhihu, etc.

Figure 5:
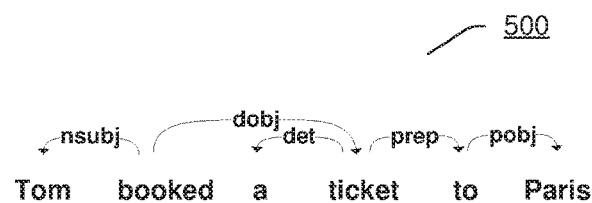
FIG. 5 illustrates an exemplary dependency parsing on an exemplary sentence according to an embodiment.

At 412, dependency parsing may be applied on the web data. Any existing dependency parser may be adopted for performing dependency parsing, e.g., predicate-argument structure analysis. Through dependency parsing, dependency arcs and dependency roles among words of a sentence may be obtained. FIG. 5 illustrates an exemplary dependency parsing 500 on an exemplary sentence according to an embodiment. Assuming that a sentence "Tom booked a ticket to Paris" is inputted to the dependency parsing. The word "booked" is determined as a predicate of the sentence. A dependency arc from "booked" to "Tom" is determined, and the dependency role between "Tom" and "booked" is determined as "nsubj", where "nsubj" denotes nominal subject. A dependency arc from "booked" to "ticket" is determined, and the dependency role between "ticket" and "booked" is determined as "dobj", where "dobj" denotes direct subject. A dependency arc from "ticket" to "a" is determined, and the dependency role between "a" and "ticket" is determined as "det", where "det" denotes determiner. A dependency are from "ticket" to "to" is determined, and the dependency role between "to" and "ticket" is determined as "prep", where "prep" denotes preposition. A dependency arc from "to" to "Paris" is determined, and the dependency role between "Paris" and "to" is determined as "pobj", where "pobj" denotes object of preposition. It should be appreciated that the dependency roles shown in FIG. 5 are exemplary, and for other sentences, various dependency roles may be determined through the dependency parsing.

At 414, dependency arcs and dependency roles among words of each sentence in the web data may be collected. The collected dependency arcs and dependency roles may be generated through the dependency parsing at 412.

At 416, a dependency word pair list may be established. The dependency word pair list may comprise a plurality of items. An item may include a pair of words and dependency role between the pair of words, and may be in a form of <word1, word2, dependency role>. Taking the sentence "Tom booked a ticket to Paris" as an example, a plurality of items, e.g., <Tom, book, nsubj>, <ticket, book, dobj>, <to, ticket, prep>, etc. may be established. In some implementations, an item may further include a frequency value which is a count of occurrence of the pair of words with the dependency role in a corpus formed by the web data obtained at 410. Thus, the item may further be in a form of <word1, word2, dependency role, frequency>, e.g., <Tom, book, nsubj, 47>, <ticket, book, dobj, 586>, etc.

At 418, knowledge question-answer (QA) pairs may be generated based on the dependency parsing at 412. For a sentence having been performed the dependency parsing, a plurality of question-answer pairs may be generated in terms of different dependency roles in the sentence and by reference to well-known question patterns. Herein, the question patterns may indicate what sentence structure and question word may be used for questioning an argument in the sentence. Taking the sentence "Tom booked a ticket to Paris" as an example, a question-answer pair of "Who booked a ticket to Paris?" and "Tom" may be generated for questioning the subject argument "Tom", a question-answer pair of "What ticket did Tom book?" and "To Paris" may be generated for questioning the object of preposition argument "Paris", etc.

At 420, a knowledge database may be established. The knowledge database may include knowledge data that can contribute to improve semantic diversity.

In some implementations, the knowledge data in the knowledge database may comprise the knowledge question-answer pairs generated at 418.

In other implementations, although not shown in FIG. 4, the knowledge data in the knowledge database may comprise a list of knowledge items. A knowledge item may include information about an entity, an attribute of the entity and a value of the attribute. The entity may be an object being interested in, the attribute may be a category to which the entity belongs, and the value may be a characteristic of the entity in the attribute. For example, for the movie "Star Wars", the entity, is "Star Wars", the attribute may be "Movie", and the value may be "science fiction", and thus a knowledge item, such as, <Star Wars, Movie, science fiction> may be included in the knowledge database.

Through the offline data mining procedure in the upper part of FIG. 4, the dependency word pair list 416 and the knowledge database 420 may be established.

In the online applying procedure shown in the lower part of FIG. 4, semantic structure completion may be applied on a current message in a chat flow.

At 430, a chat context of the chat flow may be obtained. The chat context may include historical dialog in the chat flow between the user and the chatbot, such as messages from the user and responses from the chatbot.

At 432, keywords may be extracted from the chat context. For example, for a sentence in the chat context, notional words in the sentence may be extracted as keywords, such as, nouns, verbs, adjectives, etc., while functions words in the sentence may be ignored, such as, prepositions, conjunctions, articles, etc.

At 434, candidate words may be determined. Herein, the candidate words may refer to those words that may be used for completing syntactic gaps in a sentence. Various approaches may be adopted for determining the candidate words.

In an implementation, the candidate words may be selected from the keywords extracted at 432. For example, Term Frequency-Inverse Document Frequency (TF-IDF) scores of the keywords may be computed, and the top-ranked N keywords may be selected as candidate words, where N is predetermined based on required response time.

In an implementation, the candidate words may be determined based on a heuristic rule. For example, if a message from the user includes a word "you", then according to the heuristic rule, a candidate word "I" may be determined so as to switch from "you" in the message to "I" in a response by the chatbot.

In an implementation, the candidate words may be determined from the knowledge data in the knowledge database 420. As discussed above, the knowledge database 420 may comprise knowledge items that include information about entities, attributes and values. If it is determined that a keyword having been selected as a candidate word is included as an entity in a knowledge item in the knowledge database 420, then the attribute and/or the value associated with this entity in the knowledge item may be further determined as a candidate word associated with the keyword. For example, for a keyword "Star Wars" having been selected as a candidate word, if there is a knowledge item of <Star Wars, Movie, science fiction> in the knowledge database 420, then a combination of the attribute and the value "science fiction movie" may also be determined as a candidate word associated with the "Star Wars".

At 440, a sentence completion algorithm may be applied on a current message 450 so as to obtain a completed message 460.

The sentence completion algorithm may select candidate words to complete syntactic gaps in the current message 450. The sentence completion algorithm may work in an incremental way. For example, if a candidate word is judged as a predicate or an augment of the current messages 450, the candidate word may be appended to the current message 450 to form a new message. The new message will be iteratively used for a next round judgment until there are no candidate words left.

The following Table 1 shows an exemplary flow of the sentence completion algorithm. It should be noted that all the steps in Table 1 are exemplary, and the embodiments of the present disclosure are not limited to any steps in Table 1 or the sequence order of these steps, and should cover all other equivalents under the same or similar concepts.

TABLE 1

Input: current message q, candidate word list L, dependency word pair list D
Output: completed message q
1.1     bestWord = { }
1.2     Q = {q}
1.3     for each candidate word wL in L:
1.4         pop q from Q:
1.5             lenOld = len(q)
1.6             for each word wq in q:
1.7                 if <wL, wq> in D or <wq, wL> in D:
1.8                     role = dependency role of (wL, wq)
1.9                     score = R(wL, wq, role) //Compute a score for wL and wq
1.10                  if score >= threshold:
1.11                      bestWord += {<wq, wL, role, score>}
1.12                      q = q ∪ bestWord
1.13         lenNew = len(q)
1.14         if lenNew > lenOld:
1.15             Q += q //Only when q is updated, append the new q to Q
1.16     If Q is empty:
1.17         Q = {q} // In case no predicate/argument was appended
1.18     return Q At step 1.1, a null set is assigned to bestWord. At step 1.2, the current message q is assigned to Q. At step 1.3, iterations among candidate words in the candidate word list L are defined. At step 1.4, q is popped from Q. At step 1.5, the length of q is assigned to lenOld. At step 1.6, iterations among words in q are defined. At step 1.7, it is determined that a word pair of wL and wq is included in the dependency word pair list D. At step 1.8, the dependent role between wL and wq is assigned to role. At step 1.9, a score for the word pair of wL and wq is computed by a ranker R(wL, wq, role). The ranker may determine the score through a decision tree. e.g., Gradient Boost Decision Tree (GBDT). At steps 1.10 to 1.12, if it is determined that the score is equal to or above a predetermined threshold, the bestWord and q are updated. At step 1.13, the length of the current q is assigned to lenNew. At steps 1.14 and 1.15, if it is determined that lenNew is above lenOld, then Q is updated. At steps 1.16 and 1.17, the current q is assigned to Q. At step 1.18, Q is returned.

Through the sentence completion algorithm at 440, the completed message 460 may be obtained, in which syntactic gaps have been completed.

Although not shown in FIG. 4, it should be appreciated that, besides performing semantic structure completion on messages, responses by the chatbot may also be performed semantic structure completion. Considering that a response is provided by the chatbot at least with respect to a current message, even the response may be a brief sentence, the chatbot would have known what arguments the words in the response are for the current message. Thus, the response may be completed by combining the words in the response with the current message through a predicate-argument structure analysis. For example, for a message "Who booked a ticket to Paris", the chatbot may provide a response "Tom". The word "Tom" in the response is a subject argument in the message, and thus a completed response may be "Tom (booked a ticket to Paris)". In other implementations, information for completing a message may be transferred to a corresponding response such that the response may be completed with the information. For example, in the case that a message "I play frequently" is completed as "I play (table tennis) frequently" where the "table tennis" is appended through the semantic structure completion process shown in FIG. 4, a response "Do you play well?" may be completed as "Do you play (table tennis) well?" through incorporating the information "table tennis" that was used for completing the message.

Moreover, it should be appreciated that the semantic structure completion process on messages and responses may be performed iteratively. For example, a completed message and/or a completed response may be added into the chat context 430. In this case, the chat context 430 may also include completed messages and completed responses in the chat flow.

Furthermore, it should be appreciated that the completed messages and completed responses as obtained above may also be used as training data for training the response providing model according to the embodiments of the present disclosure.

Figure 6:
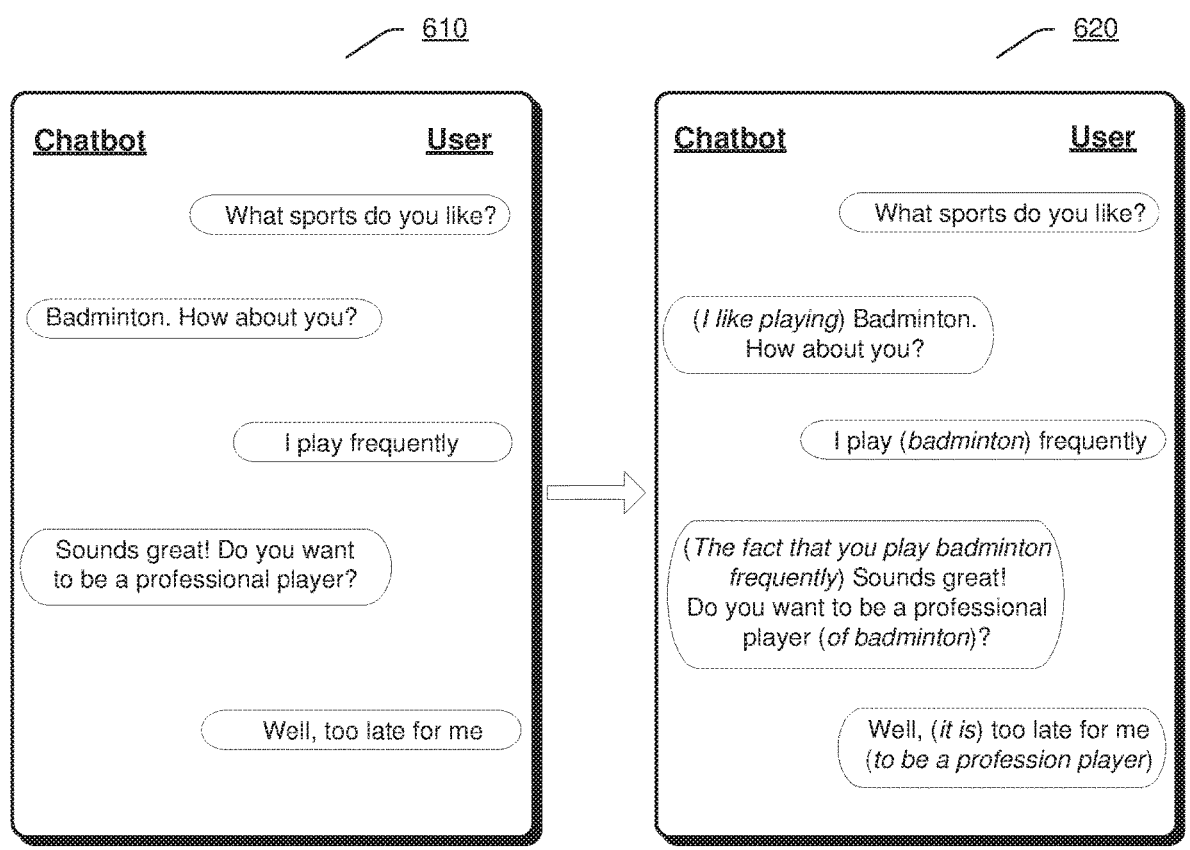
FIG. 6 illustrates an example of semantic structure completion according to an embodiment.

FIG. 6 illustrates an example of semantic structure completion according to an embodiment. Window 610 shows original messages and responses in a chat flow, and window 620 shows completed messages and responses in the chat flow.

As shown in FIG. 6, the response "Badminton" in window 610 is completed as "(I like playing) badminton" in window 620. The message "I play frequently" in window 610 is completed as "I play (badminton) frequently" in window 620. The response "Sounds great! Do you want to be a professional player?" in window 610 is completed as "(The fact that you play badminton frequently) Sounds great! Do you want to be a professional player (of badminton)?" in window 620. The message "Well, too late for me" in window 610 is completed as "Well, (it is) too late for me (to be a profession player)" in window 620.

Figure 7:
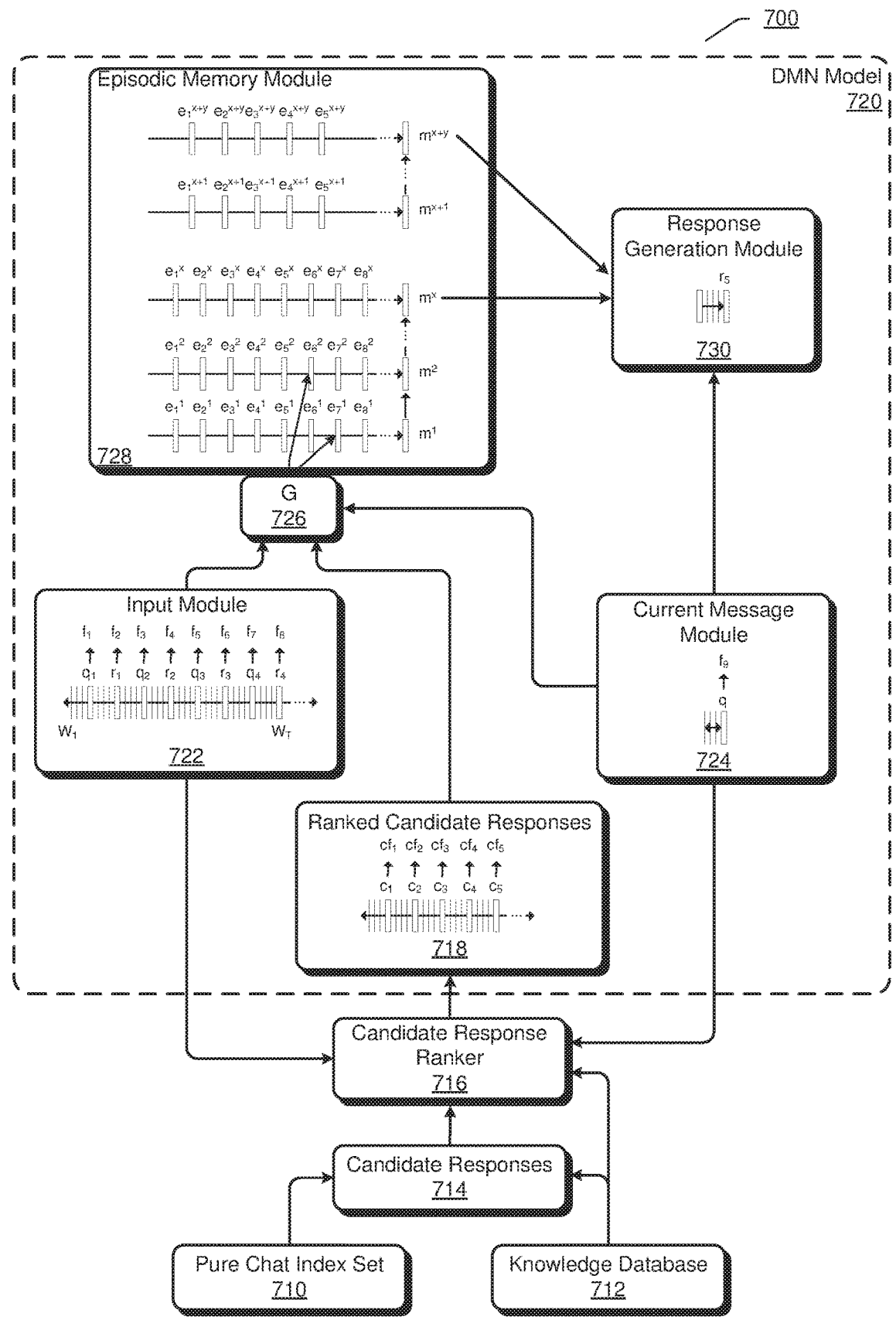
FIG. 7 illustrates an exemplary process of a response providing model according to an embodiment.

FIG. 7 illustrates an exemplary process 700 of a response providing model according to an embodiment. The response providing model may be based on a combination of a ranking procedure and a generating procedure. Through the ranking procedure, a plurality of candidate responses to a message may be ranked. Through the generating procedure, a response to the message may be generated, where the response is generated based at least on the ranked candidate responses.

As shown in FIG. 7, either of or both a pure chat index set 710 and a knowledge database 712 may be used for generating a plurality of candidate responses 714. The pure chat index set 710 may comprise index items that are prepared for free chatting between users and a chatbot. The pure chat index set 710 may be established with data from social networks, such as, Facebook, Twitter, Microblog, etc. The knowledge database 712 may comprise knowledge data and may be the same as the knowledge database 420 discussed above in connection with FIG. 4.

In an implementation, when a current message is obtained, candidate responses may be retrieved from the pure chat index set 710. For example, assuming that the current message is "Did you see Star Wars?", a candidate response "Yes, of course" may be retrieved from the pure chat index set 710.

In another implementation, candidate responses may be retrieved from the knowledge database 712. As mentioned above, the knowledge data in the knowledge database 712 may comprise knowledge question-answer pairs. If a question in a knowledge question-answer pair in the knowledge database 712 is semantically relevant to a message, the answer in this knowledge question-answer pair may be retrieved as a candidate response to the message. For example, assuming that the current message is "How do you like the movie Star Wars?" and a knowledge question-answer pair of "How about Star Wars?" and "Star Wars is a film series that is popular worldwide" is included in the knowledge database 712, the question "How about Star Wars?" in the knowledge question-answer pair may be determined as semantically relevant to the current message, and thus "Star Wars is a film series that is popular worldwide" may be retrieved as a candidate to the current message.

In another implementation, candidate responses may be retrieved from both the pure chat index set 710 and the knowledge database 712. As mentioned above, the knowledge data in the knowledge database 712 may comprise knowledge items. A knowledge item in the knowledge database 712 may be combined with a matched response index in the pure chat index set 710 to form a candidate response. For example, assuming that the current message is "Did you see Star Wars?", if a relevant response index "Yes, of course" is retrieved from the pure chat index set 710 and a relevant knowledge item of <Star Wars, Movie, science fiction> is found in the knowledge database, then a candidate response "Yes, of course. Star Wars is a science fiction film" may be generated.

It should be appreciated that semantic diversity may be enhanced if candidate responses are generated with the knowledge database.

At 716, a candidate response ranker is applied to rank the candidate responses. For example, the candidate response ranker may determine a relevance score for each of the candidate responses. The candidate response ranker may be a ranking model established through machine learning. One or more features may be adopted in the ranking model.

In an implementation, a feature in the ranking model may be based on a language model for information retrieval. This feature may evaluate the relevance between a message q and a candidate response R through:

$$P(q|R)=\Pi_{w\in q}[(1-\lambda)P_{ml}(w|R)+\lambda P_{ml}(w|C)]$$ Equation (1)

where $P_{ml}(w|R)$ is the maximum likelihood of word w estimated from R, and $P_{ml}(w|C)$ is a smoothing item that is computed as the maximum likelihood estimation in a large-scale corpus C. The smoothing item avoids zero probability, which stems from those words appearing in the candidate response R but not in the message q. $\lambda$ is a parameter that acts as a trade-off between the likelihood and the smoothing item, where $\lambda\in(0, 1)$. This feature works well when there are a number of words overlapped between the message and the candidate response.

In an implementation, a feature in the ranking model may be based on a translation-based language model. This feature may learn word-to-word and/or phrase-to-phrase translation probability from, such as, question-answer pairs, and may incorporate the learned information into the maximum likelihood. Given a message q and a candidate response R, the translation-based language model may be defined as:

$$P_{trb}(q|R)=\Pi_{w\in q}[(1-\lambda)P_{mx}(w|R)+\lambda P_{ml}(WIC)] \quad \text{Equation (2)}$$

where $$P_{mx}(w|R)=\alpha P_{ml}(w|R)+\beta P_{tr}(w|R) \quad \text{Equation (3)}$$

$$P_{tr}(w|R)=\Sigma_{v\in R}P_{tp}(w|v)P_{ml}(v|R) \quad \text{Equation (4)}$$

Here $\lambda$, $\alpha$ and $\beta$ are parameters satisfying $\lambda \in (0, 1)$ and $\alpha+\beta=1$. $P_{tp}(w|v)$ is a translation probability from word v in R to word w in q.

In an implementation, a feature in the ranking model may be an edit distance between a message and a candidate question in a word or character level. Herein, the candidate question may refer to a question in a question-answer pair which includes an answer determined as a candidate response to the message.

In an implementation, a feature in the ranking model may be a maximum subsequence ratio between a message and a candidate question.

In an implementation, a feature in the ranking model may be emotion label similarity between a message and a candidate question, or between a message and a candidate response.

In an implementation, a feature in the ranking model may be based on a latent semantic similarity model. The latent semantic similarity model takes one or more types of basic semantic units as inputs, e.g., words, n-gram phrases, chunks, dependency arcs, etc. in a message and a candidate response. The latent semantic similarity model may adopt Recurrent Neural Network (RNN) to perform sentence encoding. Various techniques may be used for the RNN sentence encoding, such as, Long-Short Term Memory (LSTM), Gated-recurrent Unit (GRU), etc. Through the latent semantic similarity model, the similarity between the message and the candidate response may be computed in a vector space.

In an implementation, a feature in the ranking model may be based on a chat context of a chat flow. The chat context may include messages from the user and responses from the chatbot. In some cases, the messages and responses in the chat context may also be completed messages and completed responses obtained through the process 400 in FIG. 4. The ranking model may extract representative words from the chat context through, such as, TF-IDF. Those candidate responses including more representative words or including representative words with a higher occurrence frequency may be given a higher score.

In an implementation, a feature in the ranking model may be based on the knowledge database. Those candidate responses determined from knowledge question-answer pairs in the knowledge database or including attributes/values in knowledge items in the knowledge database may be given a higher score. It should be appreciated that if the ranking model takes the knowledge database into account, semantic diversity may be enhanced in the ranking result from the ranking model.

The candidate response ranker 716 may determine relevance scores for the candidate responses based on the ranking model, and rank the candidate responses based on the scores. One or more top-ranked candidate responses 718 may be outputted by the candidate response ranker 716.

The response providing model in FIG. 7 may comprise a DMN model 720 for generating a response to the current message.

The DMN model 720 may comprise an input module 722. A sequence of sentences may be processed in the DMN module 720. The sequence of sentences may be messages and responses or completed messages and responses in the chat context. As an example, FIG. 7 shows four messages $q_1$, $q_2$, $q_3$, $q_4$ and four corresponding responses $r_1$, $r_2$, $r_3$, $r_4$ being processed in the input module 722. All the eight sentences may be concatenated together to form a word sequence having T words, from WI to $W_T$. A bidirectional GRU encoding may be applied on the word sequence. For the left-to-right direction or the right-to-left direction, at each time step t, the DMN model 720 may update its hidden state as $h_t$=GRU(L[$w_t$], $h_{t-1}$), where L is an embedding matrix, and $w_t$ is a word index of the t-th word in the word sequence. Thus, a resulting representation vector for a sentence is a combination of two vectors and each vector is from one direction. Internal mechanism of the GRU may be defined by the following equations:

$$z_t=\sigma(W^{(z)}x_t+U^{(z)}h_{t-1}+b^{(z)}) \quad \text{Equation (5)}$$

$$r_t=\sigma(W^{(r)}x_t+U^{(r)}h_{t-1}+b^{(r)}) \quad \text{Equation (6)}$$

$$\tilde{h}_t=\tan h(Wx_t+r_t\circ Uh_{t-1}+b^{(h)}) \quad \text{Equation (7)}$$

$$h_t=z_t\circ h_{t-1}+(1-z_t)\circ \tilde{h}_t \quad \text{Equation (8)}$$

where $\circ$ is an element-wise product, $W^{(z)}$, $W^{(r)}$, W, $U^{(z)}$, $U^{(r)}$, U are weight matrixes by training, $W^{(z)}$, $W^{(r)}$, $W\in R^{n_H\times n_I}$, and $U^{(z)}$, $U^{(r)}$, $U\in R^{n_H\times n_H}$. Here, $n_H$ denotes a dimension of hidden layer, and $n_I$ denotes a dimension of input layer. The above equations may also be abbreviated as $h_t$=GRU($x_t$, $h_{t-1}$).

In addition to encoding the word sequence, a positional encoding with bidirectional GRU may also be applied so as to represent "facts" of the sentences. The facts may be computed as $f_t$=GRU$_{l2r}$(L[$S_t$], $f_{t-1}$)+GRU$_{r2l}$(L[$S_t$], $f_{t-1}$), where l2r denotes left-to-right, r2l denotes right-to-left. $S_t$ is an embedding expression of a current sentence, and $f_{t-1}$ and $f_t$ are facts of a former sentence and the current sentence respectively. As shown in FIG. 7, facts $f_1$ to $f_8$ are obtained for the eight sentences.

The DMN model 720 may comprise a current message module 724. The encoding for the current message is a simplified version of the input module 722, where there is only one sentence to be processed in the current message module 724. The processing by the current message module 724 is similar with the input module 722. Assuming that there are $T_Q$ words in the current message, hidden states at the time step t may be computed as $q_t$=[GRU$_{l2r}$(L[$W_t^Q$], $q_{t-1}$), GRU$_{r2l}$(L[$W_t^Q$], $q_{t-1}$)], where L is an embedding matrix, and $W_t^Q$ is a word index of the t-th word in the current message. Moreover, a fact $f_9$ may be obtained for the current message in the current message module 724.

The DMN model 720 may comprise a ranked candidate responses module 718. The DMN model 720 may compute hidden stats and facts for the ranked candidate responses in the same way as the input module 722. As an example, FIG. 7 shows five candidate responses $C_1$ to $C_5$, and five facts $cf_1$ to $cf_5$ are obtained for these candidate responses.

The DMN model 720 may comprise an episodic memory module and an attention mechanism module. The episodic memory module may include a recurrent network, and the attention mechanism module may be based on a gating function. The attention mechanism module may be separated from or incorporated in the episodic memory module.

In a conventional computing process, the episodic memory module and the attention mechanism module may cooperate to update episodic memory in an iteration way. For each pass i, the gating function of the attention mechanism module may take a fact $f^i$, a previous memory vector $m^{i-1}$, and a current message q as inputs, to compute an attention gate $g_t^i = G[f^i, m^{i-1}, q]$. To compute the episode $e^i$ for pass i, a GRU over a sequence of inputs, e.g., a list of facts $f^i$, weighted by the gates gi may be applied. Then the episodic memory vector may be computed as $m^i = GRU(e^i, m^{i-1})$. Initially, $m^0$ is equal to a vector expression of the current message q. The episode vector that is given to a response generation module may be the final state $m^x$ of the GRU. The following Equation (9) is for updating hidden states of the GRU at a time step t, and the following Equation (10) is for computing the episode.

$$h_t^i = g_t^i GRU(f_t, h_{t-1}^i) + (1-q_t^i) h_{t-1}^i \qquad \text{Equation (9)}$$

$$e^i = h_{T_c}^i \qquad \text{Equation (10)}$$

where $T_c$ is the number of input sentences.

According to the embodiment of the present disclosure, the processing in the episodic memory module and the attention mechanism module in the DMN model further takes the ranked candidate responses into account. As shown in FIG. 7, besides the input module 722 and the current message module 724, the attention mechanism module 726 also obtains input from the ranked candidate responses module 718. Thus, the attention gate may be computed as $g_t^i = G[f^i, m^{i-1}, q, cf^i, m^{x+i-1}]$, where $cf^i$ denotes the facts from the ranked candidate responses, and $m^{x+i-1}$ is a memory vector computed for the ranked candidate responses. Accordingly, the recurrent network in the episodic memory module 728 further comprises a computing process of memories $m^{x+1}$ to $m^{x+y}$ for the ranked candidate responses. Outputs from the episodic memory module 728 to the response generation module 730 will include both $m^x$ and $m^{x+y}$.

The response generation module 730 may be used for generating a response. A GRU decoder may be adopted in the response generation module 730, and an initial state of the GRU decoder may be initialized to be the last memory vector $a_0 = [m^x, m^{x+y}]$. At a time step t, the GRU decoder may take the current message q, a last hidden state $a_{t-1}$, and a previous output $y_{t-1}$ as inputs, and then compute a current output as:

$$y_t = \text{softmax}(W^{(a)} a_t) \qquad \text{Equation (11)}$$

where $a_t = GRU([y_{t-1}, q], a_{t-1})$, and $W^{(a)}$ is a weight matrix by training.

The output from the response generation module 730 may be provided to the user as a response to the current message inputted by the user.

It should be appreciated that since the generating procedure in the process 700 of FIG. 7 takes the ranked candidate responses generated through the ranking procedure as inputs, the response outputted by the process 700 would possess both semantic similarity and semantic diversity, and also be in an expression form of natural language sentences.

Figure 8:
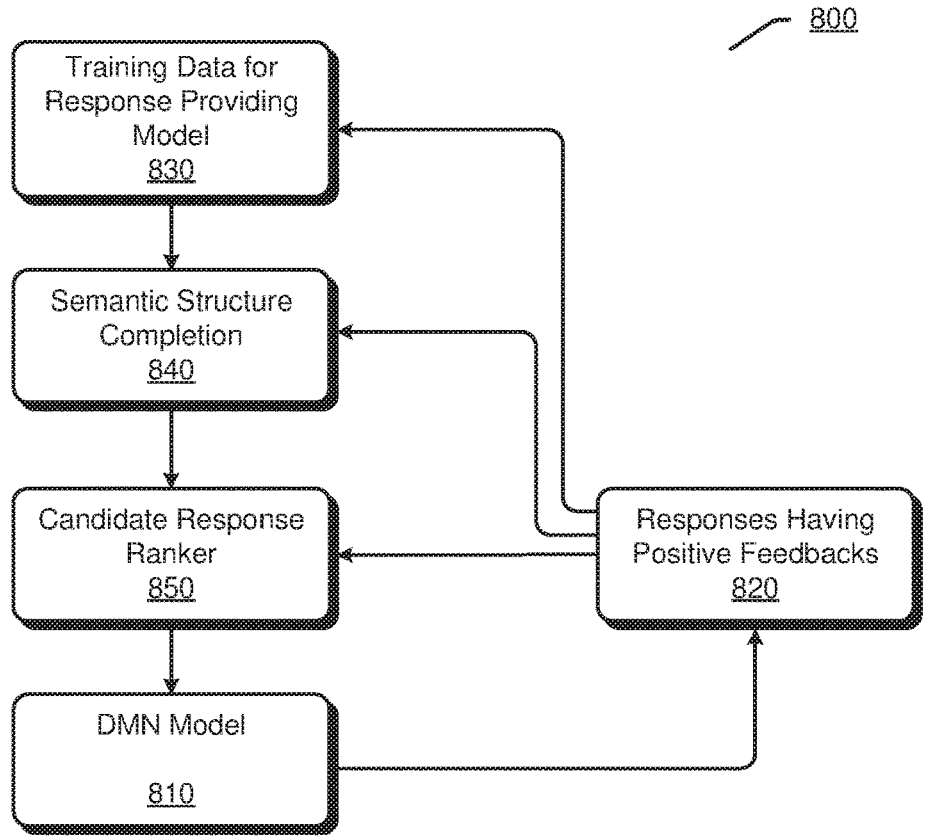
FIG. 8 illustrates an exemplary joint network framework according to an embodiment.

FIG. 8 illustrates an exemplary joint network framework 800 according to an embodiment. The joint network framework 800 shows dynamical updating among a plurality of components/procedures in various implementations of the present disclosure.

A DMN model 810 may generate responses to messages inputted by a user according to the process 700 in FIG. 7. The generated responses may be provided to the user. Some responses 820 may receive positive feedbacks from the user. Herein, a positive feedback to a response from the user may include a further message from the user following the response, positive emotion of the user on the response, comments of the user concurring with the response, etc. The responses 820 having positive feedbacks may be provided for updating other components/procedures.

The responses 820 may be used for updating training data 830 that is for training the response providing model. For example, the responses 820 may be used as new training data and added into the training data 830.

The responses 820 may be used as new training data for the semantic structure completion process 840. For example, if the responses 820 are performed semantic structure completion, the completed responses 820 may be used as positive instances for training the semantic structure completion process 840. Here, the training data 830 may also be provided for training the semantic structure completion process 840.

The responses 820 may be provided to the candidate response ranker 850 as new training data. The ranking model in the candidate response ranker 850 may be updated based on the new training data. Moreover, the chat context, as a feature of the ranking model, may also be updated by including the responses 820. Here, the semantic structure completion process 840 may also provide training data or completed chat context to the candidate response ranker 850.

The candidate response ranker 850 may provide candidate responses to the DMN model 810, at least with which the DMN model 810 may generate responses.

It should be appreciated that the updating among the components/procedures in the joint network framework 800 is performed in a dynamical and timely way.

Figure 9:
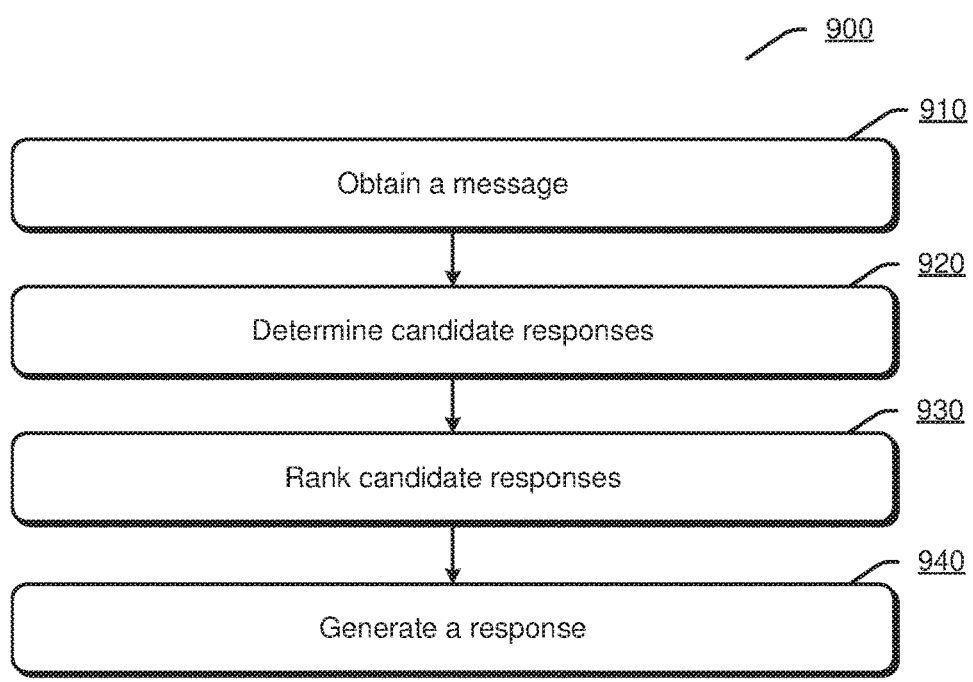
FIG. 9 illustrates a flowchart of an exemplary method for generating responses in automated chatting according to an embodiment.

FIG. 9 illustrates a flowchart of an exemplary method 900 for generating responses in automated chatting according to an embodiment.

At 910, a message in a chat flow may be obtained.

At 920, a plurality of candidate responses to the message may be determined.

At 930, the candidate responses may be ranked based at least on knowledge data.

At 940, a response to the message may be generated based at least on one or more ranked candidate responses.

In an implementation, the method 900 may further comprise: before determining the plurality of candidate responses to the message, completing syntactic gaps in the message based at least on a predicate-argument structure analysis. The completing may comprise: obtaining a chat context of the chat flow; extracting keywords from the chat context; determining candidate words based on at least one of the keywords, the knowledge data and a heuristic rule; and appending a candidate word to the message based at least on a dependency role between the candidate word and a word in the message.

In an implementation, the dependency role may be determined from a dependency word pair list, the dependency word pair list comprising at least a plurality of word pairs and dependency roles of the plurality of word pairs.

In an implementation, the appending the candidate word to the message may comprise: scoring the candidate word based at least on the dependency role; and appending the candidate word to the message if a score of the candidate word is above a predetermined threshold.

In an implementation, the plurality of candidate responses may be determined based at least on the knowledge data.

In an implementation, the response may be generated through a DMN model, the DMN model taking at least the one or more ranked candidate responses as inputs.

In an implementation, the method 900 may further comprise generating attention gates iteratively based on at least one of: facts corresponding to a chat context of the chat flow and the one or more ranked candidate responses; memory vectors associated with the chat context; memory vectors associated with the one or more ranked candidate responses; and a vector corresponding to the message.

In an implementation, the method 900 may further comprise: generating, based at least on the attention gates, the memory vectors associated with the chat context and the memory vectors associated with the one or more ranked candidate responses iteratively.

In an implementation, the method 900 may further comprise: generating the response based at least on one of the memory vectors associated with the chat context and/or one of the memory vectors associated with the one or more ranked candidate responses.

It should be appreciated that the method 900 may further comprise any steps/processes for generating responses in automated chatting according to the embodiments of the present disclosure as mentioned above.

Figure 10:
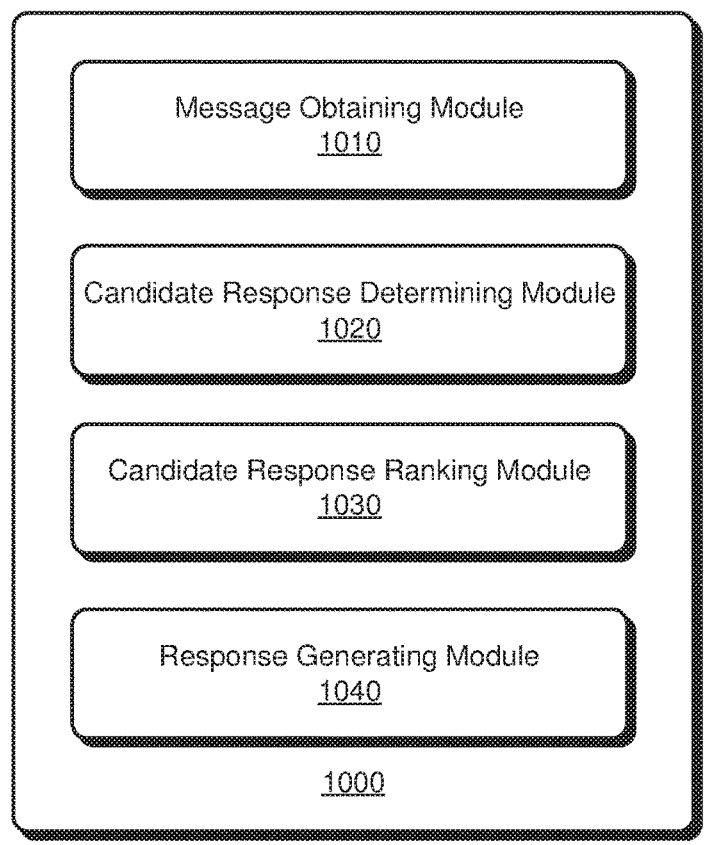
FIG. 10 illustrates an exemplary apparatus for generating responses in automated chatting according to an embodiment.

FIG. 10 illustrates an exemplary apparatus 1000 for generating responses in automated chatting according to an embodiment.

The apparatus 1000 may comprise: a message obtaining module 1010, for obtaining a message in a chat flow: a candidate response determining module 1020, for determining a plurality of candidate responses to the message; a candidate response ranking module 1030, for ranking the candidate responses based at least on knowledge data; and a response generating module 1040, for generating a response to the message based at least on one or more ranked candidate responses.

In an implementation, the apparatus 1000 may further comprise a message completing module, for completing syntactic gaps in the message based at least on a predicate-argument structure analysis. The message completing module may be for: obtaining a chat context of the chat flow: extracting keywords from the chat context; determining candidate words based on at least one of the keywords, the knowledge data and a heuristic rule; and appending a candidate word to the message based at least on a dependency role between the candidate word and a word in the message. The appending the candidate word to the message may comprise: scoring the candidate word based at least on the dependency role; and appending the candidate word to the message if a score of the candidate word is above a predetermined threshold In an implementation, the dependency role may be determined from a dependency word pair list, the dependency word pair list comprising at least a plurality of word pairs and dependency roles of the plurality of word pairs.

In an implementation, the plurality of candidate responses may be determined based at least on the knowledge data.

In an implementation, the response may be generated through a DMN model, the DMN model taking at least the one or more ranked candidate responses as inputs.

In an implementation, the apparatus 1000 may further comprise an attention gate generating module, for generating attention gates iteratively based at least one of: facts corresponding to a chat context of the chat flow and the one or more ranked candidate responses; memory vectors associated with the chat context; memory vectors associated with the one or more ranked candidate responses; and a vector corresponding to the message.

In an implementation, the apparatus 1000 may further comprise a memory vector generating module, for generating, based at least on the attention gates, the memory vectors associated with the chat context and the memory vectors associated with the one or more ranked candidate responses iteratively.

In an implementation, the response generating module may be for: generating the response based at least on one of the memory vectors associated with the chat context and/or one of the memory vectors associated with the one or more ranked candidate responses.

Moreover, the apparatus 1000 may also comprise any other modules configured for performing any operations of the methods for generating responses in automated chatting according to the embodiments of the present disclosure as mentioned above.

Figure 11:
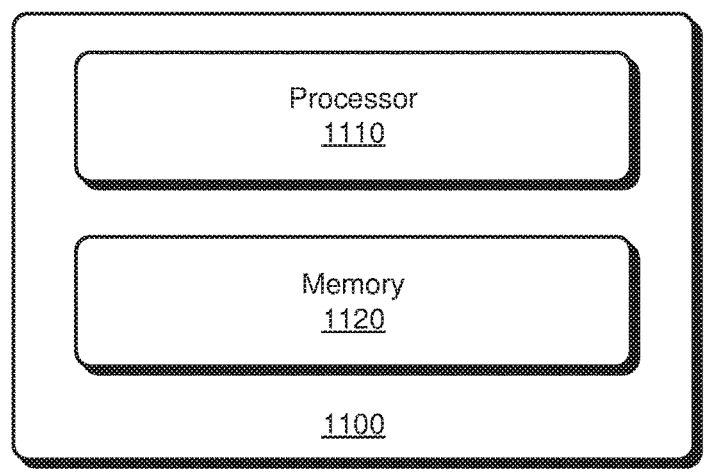
FIG. 11 illustrates an exemplary apparatus for generating responses in automated chatting according to an embodiment.

FIG. 11 illustrates an exemplary apparatus 1100 for generating responses in automated chatting according to an embodiment.

The apparatus 1100 may comprise a processor 1110. The apparatus 1100 may further comprise a memory 1120 that is connected with the processor 1110. The memory 1120 may store computer-executable instructions that, when executed, cause the processor 1110 to perform any operations of the methods for generating responses in automated chatting according to the embodiments of the present disclosure as mentioned above.

The embodiments of the present disclosure may be embodied in a non-transitory computer-readable medium. The non-transitory computer-readable medium may comprise instructions that, when executed, cause one or more processors to perform any operations of the methods for generating responses in automated chatting according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller. DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors (e.g., cache or register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

What is claimed is:

1. A method for generating responses in automated chatting, the method comprising:
   accessing a message in a chat flow;
   completing syntactic gaps in the message by using dependency parsing based at least on a predicate-argument structure analysis to create at least one dependency word pair included in a dependency word pair list;
   determining a plurality of candidate responses to the message based on one or more candidate words associated with the message;
   evaluating semantic similarity of each candidate response based at least on relevance between the one or more candidate words associated with the message and each candidate response;
   evaluating semantic diversity of each candidate response based at least on knowledge data comprising a list of knowledge items, each knowledge item comprising an entry in a knowledge database that includes an entity associated with the message, an attribute of the entity, and a value of the attribute, the evaluating including determining candidate responses that include attributes in the list of knowledge items;
   ranking each candidate response of the plurality of candidate responses by applying each candidate response to a ranking model, the ranking model generating a score for each candidate response based on the relevance, whether the candidate response includes the attributes in the list of knowledge items, and chat context from previous messages from a user and previous responses from a chatbot;
   based on the ranking, selecting, from the plurality of candidate responses, one or more candidate responses for inclusion in a response to the message; and
   generating the response to the message based at least on the one or more selected candidate responses, the generating comprising using the one or more candidate words to form the response, the response including both semantic similarity and semantic diversity in an expression of one or more natural language sentences.

2. The method of claim 1, wherein the completing comprises:
   obtaining a chat context of the chat flow;
   extracting keywords from the chat context;
   determining the one or more candidate words based on at least one of the keywords, knowledge data, and a heuristic rule; and
   appending at least one of the one or more candidate words to the message based at least on a dependency role between the at least one of the one or more candidate words and a word in the message.

3. The method of claim 2, wherein the dependency role is determined from the dependency word pair list, the dependency word pair list comprising at least a plurality of word pairs and dependency roles of the plurality of word pairs.

4. The method of claim 2, wherein the appending comprises:
   scoring the one or more candidate words based at least on the dependency role; and
   appending the at least one of the one or more candidate words to the message based on a score of the at least one of the one or more candidate words being above a predetermined threshold.

5. The method of claim 1, wherein the response is generated through a Dynamic Memory Network (DMN) model, the DMN model taking at least the one or more ranked candidate responses as an input to the DMN model.

6. The method of claim 1, further comprising:
   generating attention gates iteratively based on at least one of:
   facts corresponding to a chat context of the chat flow and the one or more ranked candidate responses;
   memory vectors associated with the chat context;
   memory vectors associated with the one or more ranked candidate responses; or
   a vector corresponding to the message.

7. The method of claim 6, further comprising:
   generating, based at least on the attention gates, the memory vectors associated with the chat context and the memory vectors associated with the one or more ranked candidate responses iteratively.

8. The method of claim 6, further comprising:
   generating the response based at least on one of the memory vectors associated with the chat context or one of the memory vectors associated with the one or more ranked candidate responses.

9. The method of claim 1, wherein the relevance that is used for generating the score for each candidate response of the plurality of candidate responses is between the one or more candidate words associated with the message and each candidate response, and the ranking further comprises:
   evaluating the semantic similarity or semantic diversity by determining a relevance factor between the message and each candidate response of the plurality of candidate responses based on one or more words, n-gram phrases, chunks, or dependency arcs.

10. The method of claim 1, wherein at least one candidate response from the plurality of candidate responses includes an enhanced ranking result based on context from the chat flow identified from extracted representative words from previous messages and previous responses in the chat flow.

11. An apparatus for generating responses in automated chatting, the apparatus comprising:
    a message accessing module for accessing a message in a chat flow;
    a message completing module for completing syntactic gaps in the message by using dependency parsing based at least on a predicate-argument structure analysis to create at least one dependency word pair included in a dependency word pair list;

a candidate response determining module for determining a plurality of candidate responses to the message based on one or more candidate words associated with the message, for evaluating semantic similarity of each candidate response based at last on relevance between the one or more candidate words associated with the message and each candidate response, and for evaluating semantic diversity of each candidate response based at least on knowledge data comprising a list of knowledge items, each knowledge item comprising an entry in a knowledge database that includes an entity associated with the message, an attribute of the entity, and a value of the attribute, the evaluating including determining candidate responses that include attributes in the list of knowledge items;

a candidate response ranking module for ranking each candidate response of the plurality of candidate responses by applying each candidate response to a ranking model, the ranking model generating a score for each candidate response based on the relevance, whether the candidate response includes attributes in the list of knowledge items, and chat context from previous messages from a user and previous responses from a chatbot, and based on the ranking selecting, from the plurality of candidate responses, one or more ranked candidate responses for inclusion in a response to the message; and a response generating module for generating the response to the message based at least on the one or more selected candidate responses, the generating comprising using the one or more candidate words to form the response the response including both semantic similarity and semantic diversity in an expression of one or more natural language sentences.

12. The apparatus of claim 11, wherein the message completing module performs operations comprising:
obtaining a chat context of the chat flow;
extracting keywords from the chat context;
determining the one or more candidate words based on at least one of the keywords, knowledge data, and a heuristic rule; and
appending at least one of the one or more candidate words to the message based at least on a dependency role between the at least one of the one or more candidate words and a word in the message.

13. The apparatus of claim 12, wherein the dependency role is determined from the dependency word pair list, the dependency word pair list comprising at least a plurality of word pairs and dependency roles of the plurality of word pairs.

14. The apparatus of claim 12, wherein the appending comprises:
scoring the one or more candidate words based at least on the dependency role; and
appending the at least one of the one or more candidate words to the message based on a score of the at least one of the one or more candidate words being above a predetermined threshold.

15. The apparatus of claim 11, wherein the response is generated through a Dynamic Memory Network (DMN) model, the DMN model taking at least the one or more ranked candidate responses as an input to the DMN model.

16. The apparatus of claim 11, further comprising:
an attention gate generating module for generating attention gates iteratively based on at least one of:
facts corresponding to a chat context of the chat flow and the one or more ranked candidate responses;
memory vectors associated with the chat context;
memory vectors associated with the one or more ranked candidate responses; or
a vector corresponding to the message.

17. The apparatus of claim 16, further comprising:
a memory vector generating module for generating, based at least on the attention gates, the memory vectors associated with the chat context and the memory vectors associated with the one or more ranked candidate responses iteratively.

18. The apparatus of claim 16, wherein the response generating module generates the response based at least on one of the memory vectors associated with the chat context or one of the memory vectors associated with the one or more ranked candidate responses.

* * * * *